Nov. 6, 1928.
S. W. RUSHMORE
1,690,703
ENGINE COOLING SYSTEM
Filed April 19, 1927
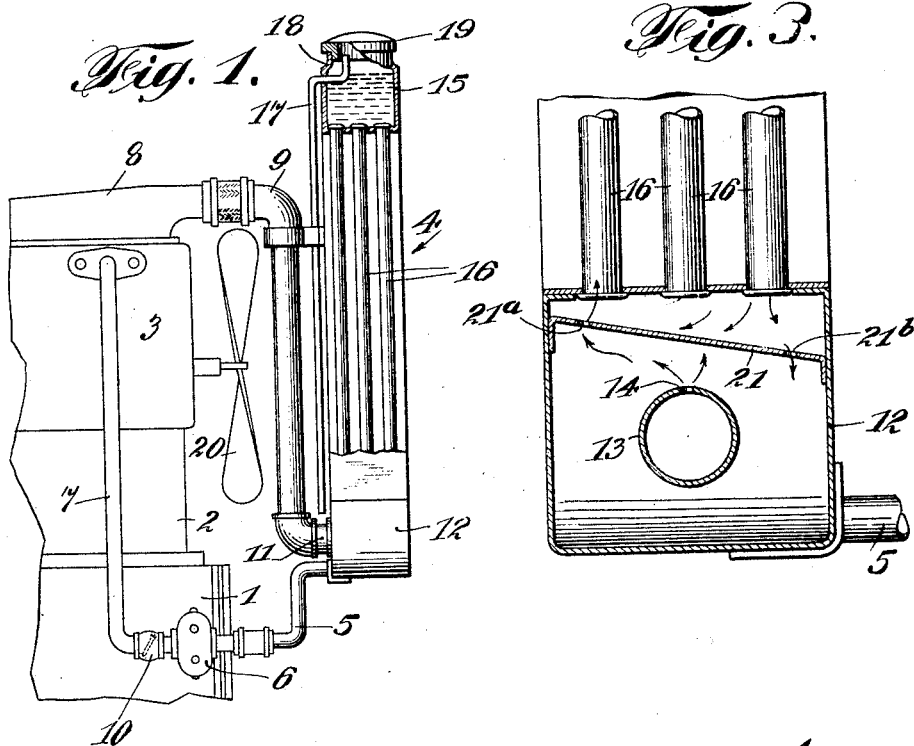
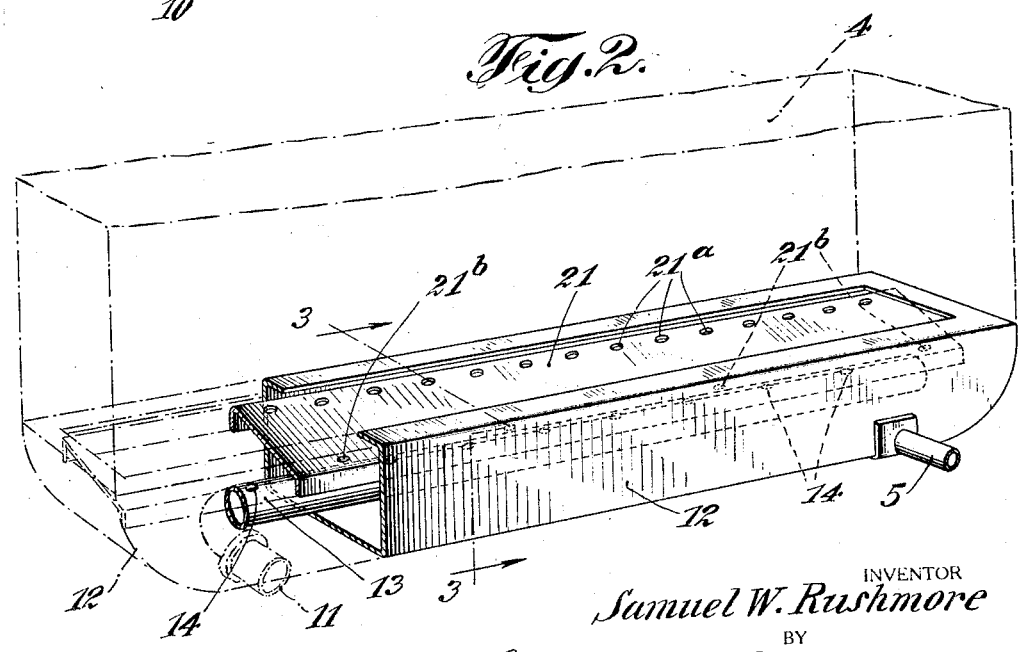
INVENTOR
Samuel W. Rushmore
BY
George C. Ahearn ATTORNEY Patented Nov. 6, 1928.

1,690,703

UNITED STATES PATENT OFFICE.

SAMUEL W. RUSHMORE, OF PLAINFIELD, NEW JERSEY.

ENGINE-COOLING SYSTEM.

Application filed April 19, 1927. Serial No. 184,877.

My present invention relates more particularly to cooling systems of the type commonly employed on automobiles or the like, but in which the heat transfer is mainly by boiling or superheating water to absorb surplus heat of the engine and condensing the resultant steam to dissipate said heat in the radiator. The problems are therefore generically similar to those set forth in certain of my prior patents, particularly No. 1,378,724, granted May 17, 1921. There is further similarity in that the apparatus preferably embodies a force feed water circulating system of small heat radiating capacity serially including a water jacket, a water outlet pipe from said jacket, and a water container to which said pipe is connected, in combination with large capacity radiating means above the water container, and preferably also a low resistance outlet for escape to the outer air for steam, air or water.

On the other hand, my present arrangement is primarily intended to avoid some of the specific features of said patent such as having only the lower chamber of the radiator filled with water; having the honeycomb or core operate mainly as an upflow condenser in which all of the cooling passages have steam flowing upward and condensate flowing downward in the same passage; and having the upper chamber operate mainly as a header for escape of air from all the passages.

Some of these complications in my prior apparatus resulted because the upflow of the steam was in accordance with the laws of flow of elastic gases, namely, steam and air and, in lieu of controlling operations in accordance with said laws, my present invention contemplates dominating the steam flow by establishing and maintaining thermo-siphon circulation of water in the radiator in such a way that the steam accelerates it, without interfering with it. Preferably, therefore, I continuously maintain a body of water submerging the honeycomb and much of the upper chamber, during normal operation of the apparatus.

While I circulate much more water than is necessary in my prior apparatus, the short circuiting through the base of the radiator causes the discharge therein to be a mixture comprising steam and water which is more or less superheated, and therefore evolves steam progressively as the pressure is relieved. The part of the water that goes to steam has its volume thereby increased some seventeen hundred times. When this happens in the condenser tubes, it may result in a blast mixture of steam propelling several times its weight of steaming water. A contributory factor is that, in practice, the water is persistently foamy and frothy at times.

I find that ordinary precautions will not prevent the steam from flowing to some of the tubes in such volumes as to fill considerable lengths thereof and if it condenses instead of flowing through, the final stage is a sudden collapse of such extent that the resulting inrush of water produces loud noises in the tubes which render the apparatus very objectionable, particularly for automobile use.

Heating of the water in the base of a full radiator, naturally sets up a thermo-siphon circulation, the warmer and therefore lighter water flowing upward in some of the tubes while the colder, heavier water naturally flows downward into the lower chamber from other tubes as fast as it becomes chilled, and the rate of the circulation tends to increase automatically with increase in the rate of heat dissipation which, of course, tends to increase with the temperature differential. In a tube radiator, this circulation is naturally upward through the less well cooled tubes which are in the rear and at the sides.

It results that when the radiator is full of water, the entire surface areas of all of the honeycomb and upper chamber are continuously operative for effectively radiating heat, instead of coming into operation progressively from the bottom up, in proportion as the steam evolution increases, and these areas being sufficient for cooling under conditions of maximum heat evolution, it follows that normally the downflow into the lower chamber will be relatively cold. Consequently, merely short-circuiting the pump circulation through the lower chamber of the radiator is not sufficient to ensure the high temperature for the water that is necessary for preventing noisy water hammer effects, and that is desirable for supplying the intake of the pump.

To meet these conditions, my present invention contemplates closer association of the pump intake with the discharge from the engine jacket in such manner that it will be less accessible for the relatively cold water coming directly from the downflow tubes of the honeycomb yet in such relation that under conditions of maximum steam discharge, the pump intake will not suck in steam nor interfere with proper disposition thereof.

Under these conditions, I arrange to have the fluid mixture from the water jacket subdivided and distributed through a series of lateral holes in a relatively long conduit disposed lengthwise in the lower chamber; the remote end being preferably plugged to prevent direct discharge to the intake of the pump. This alone would leave the steam discharge in close operative relation to the thermo-siphon circulation in the radiator, with the result that under many conditions of operation the water surrounding the steam discharge would be cold enough to produce violent water hammer effects and noises besides making the intake supply for the pump too cold.

In my prior application, Ser. No. 128,345, I have disclosed one way of obviating the noisy water hammer effects by means of thick layers of wire gauze, in combination with means for insuring high temperature for the pump intake; but my present invention contemplates different and in many respects preferably means for accomplishing both of these objects. In the present case I dispense with the wire gauze and permit the jacket water discharge to flow directly into the body of water in the lower chamber, the desired effect being produced by a partition specifically designed and arranged to partially isolate the thermo-circulation in the radiator tubes from the region of steam discharge. Preferably, the partition is inclined from front to rear of the radiator and has two series of outlets, one along the upper edge and another row along the lower edge. The partition is sufficiently below the bottoms of the radiator tubes to permit complete closed circuit thermo-circulation up some of the tubes and down others. The number and sizes of the holes in the partition can be regulated so that the steam discharge region below the partition can be given any desired degree of accessibility for the tube thermo-circulation.

With a given number and size for the holes, the inclination of the partition causes the extent of invasion of the lower chamber by the thermo-circulation of the tubes, to vary automatically in accordance with the heat conditions in the steam discharge chamber below the partition. For instance, when all the water below the partition is at boiling point and excess steam is forced through the upper row of escape holes, the upflow circulation in adjacent radiator tubes will be greatly accelerated and the downpouring from the rear tubes into the lower row of holes will be gradually increased, thus automatically lowering the temperature and causing more steam condensation in the compartment below the partition.

Normally, the partly segregated hot water in the lower compartment will protect the steam from contact with the relatively cold water from the downflow tubes, thus preventing the excessive noise that results from sudden condensation when steam contacts with water that is too cold. The heating up being gradual, no uncondensed steam issues from the discharge pipe until all the water below the partition is hot enough to take care of it.

The above and other features of my invention may be more fully understood from the following description in connection with the accompanying drawings, in which Fig. 1 is a somewhat schematic side elevation of an automobile motor and radiator, equipped in accordance with my present invention, the upper chamber of the radiator being broken away in vertical section;

Fig. 2 is a schematic view in perspective, partly in full lines and partly in dotted lines, showing the arrangement of the steam discharge and partition in the lower chamber of the radiator; and Fig. 3 is a cross-section on the line 3—3, Fig. 2.

In Fig. 1, the motor is conventionally indicated as including the usual crank case 1, and cylinder block 2, the upper parts of which are enclosed by water jacket 3. The water cooling system is conventionally indicated as including the radiator 4, located as usual, on the same level with the motor and directly in front of it so that the lower part of the radiator is below the level of the water jacket of the motor. The circulation of the water from the bottom of the radiator is through a pipe 5 to pump 6, the latter being preferably driven from the engine at directly proportional speeds. The pump is indicated as being a gear pump, but this is merely to illustrate that the pump is one adapted to receive boiling water and force it into the water jacket against friction and any back pressure that may be caused by steaming. The pump discharges through a pipe 7, preferably into the top of the water jacket 3, whence the path of flow is through riser outlet 8, and downwardly extending return pipe 9. The pipe 7 may contain a check valve 10 to insure against back flow of water or steam such as might otherwise occur under operating conditions when the engine and pump are stopped. The return pipe 9 connects with a pipe 11, passing through the rear wall of the lower chamber of the radiator, although the bottom or an end wall may be used if desired. Inside the radiator, the pipe 11 has a horizontal portion 13, extending lengthwise of the lower chamber 12 and preferably plugged at the far end, the discharge outlet being provided in the form of a row of holes preferably in the top side of the pipe. These holes may be of such size or so graduated as to ensure approximately uniform discharge of fluid throughout its length.

The radiator is indicated as having the usual lower chamber 12 and upper chamber 15, serving as headers for the intermediate core, indicated at 16 as comprising a great multiplicity of small tubes, there being in practice many more than indicated in the drawings. The upper chamber is preferably provided with an overflow pipe 17, which preferably extends into the neck 18, which is closed by a filler cap 19. This overflow pipe is preferably freely opened to atmosphere, although it may be supplied with pressure sustaining breather valves as described in various of my prior patents and applications.

These radiators are thin from front to rear, usually 2¼ inches to 3 inches, and the core may consist of tubes which may be, say, ¼ inch to ⅜ inch diameter. The core may be, say, 21 inches by 24 inches, the usual fan, 20, causing a front to rear draft, the front tubes are naturally better cooled than the rear tubes and the middle tubes better cooled than the side tubes.

Application of my invention to such a conventional radiator requires only insertion of the perforated discharge pipe, 13, connected up to the pipe 9 leading from the water jacket, and the brazing in or soldering of the partition 21, which may be merely a strip of sheet metal with the ends turned down for brazing to the wall of the chamber 12. As shown more clearly in Fig. 3, the partition is located well above the discharge pipe 13, quite close to the lower ends of the radiator tubes 16, but spaced apart therefrom sufficiently to permit closed circuit thermo-circulation from a rear tube 16 to a front tube 16, as indicated by the arrow. While this circulation is naturally downward through the front tubes and upward through the rear tubes, such direction of circulation is preferably modified by the upslope of the partition toward the bottoms of the front tubes and the provision of a high level row of holes, 21$^a$, in proximity to said tubes, in combination with the low level row of holes, 21$^b$, below the rear tubes. That is to say, so long as all the water above the partition remains fairly cool, the thermo-circulation through the tubes may be down the front tubes and up the rear tubes, thus tending to counterbalance the reverse thermo tendency of the body of water below the partition, but as soon as the latter body gets hot and particularly when steam begins to flow up through the holes 21, the circulation is bound to be up the front, best-cooled tubes and down other more remote tubes. Whether inclined or not, the partition seems to perform functions similar to those described and claimed in my prior application above referred to, but the means is simpler, cheaper and in some respects more effective, particularly as concerns insuring a supply of hot water for the intake of the pump. The operation of the system is as follows:

When the engine is cold, all of the water is cold and there is practically no tendency to thermo-circulation in the tubes 16. Therefore, during the warming up period, the circulation is substantially short-circuited in the chamber below the partition 21. As the water heats up, there is increasing tendency to thermo-circulation, but in actual practice, I have discovered that such circulation does not materially retard the warming up and, in fact, does not amount to much until the water is boiling and steam begins to discharge through the holes 14. By that time, the water in the lower compartment will have reached the temperature above 180° F., and I have discovered that at and above approximately this temperature, discharge of steam into the water causes no noise or water hammer effects. For a considerable time, under average conditions of the motor and the cooling system, substantially all of the steam may be condensed in the hot water in the lower compartment, but even so, the ballooning of steam toward the upper row of outlet holes 21$^a$ tends to establish outflow of water through said holes in addition to the ordinary static or thermo-syphon tendency of the water itself to rise. In this phase of the operation, the cold water will be drawn down through the holes 21$^b$ at greater rates, accordingly as the upflow through holes 21$^a$ increases. Ultimately, steam may escape through holes 21$^a$, in which case it will balloon into the front tubes, 16, causing disproportionally great acceleration of the thermo-circulation up through said front tubes, across the upper chamber and down through the rear tubes. Thus, with the peculiar arrangement shown, the thermo-circulation in the radiator tubes is practically controlled by thermo conditions and thermoflow in the lower compartment. This control is so perfect that in actual practice, it will be found that for average conditions, the lower compartment will draw into itself enough cool water to condense substantially all of the steam within said compartment and that under extreme steaming conditions, the steam itself escaping from said compartment will accelerate the thermo-circulation in the tubes to the point where the maximum cooling capacity of the entire radiator is brought into play.

In order to take care of maximum steaming conditions, the upper holes are much greater in number and greater total flow section than the lower row.

While I have referred to the front tubes as being thus most directly operated upon for functioning as upflow tubes, it will be obvious that the tube circulation will shift under varying conditions, so that many of the side tubes and even some of the central or front tubes may partake of the up-circulation of steam, a few of the coldest tubes being capable of taking care of the down flow, when steam upflow and condensation in the other tubes is at a maximum.

I claim:

1. In combination, a force feed circulating system for cooling variable duty engines by heating water to absorb heat of the engine under certain conditions and by also boiling it to produce large volumes of steam under other conditions, means for cooling the water and condensing the steam, including an air cooled, water-filled radiator of the upright type having passages of great radiating capacity connected at the bottom through a lower chamber of small radiating capacity and at the top by an upper chamber whereby said passages are submerged; said force feed system intaking water from and discharging water and steam to said lower chamber, and means enclosing a body of water adjacent said discharge and intake of the force feed system adapted to restrict thermo-circulation between said body and the bottoms of said radiating passages.

2. In combination, a force feed circulating system for cooling variable duty engines by heating water to absorb heat of the engine under certain conditions and by also boiling it to produce large volumes of steam under other conditions, means for cooling the water and condensing the steam, including an air cooled, water-filled radiator of the upright type having passages of great radiating capacity connected at the bottom through a lower chamber of small radiating capacity and at the top by an upper chamber whereby said passages are submerged; said force feed system intaking water from and discharging water and steam to said lower chamber; and means enclosing a body of water adjacent said discharge and intake of the force feed system and having a number of restricted flow passages.

3. In combination, a force feed circulating system for cooling variable duty engines by heating water to absorb heat of the engine under certain conditions and by also boiling it to produce large volumes of steam under other conditions, means for cooling the water and condensing the steam, including an air cooled, water-filled radiator of the upright type having passages of great radiating capacity connected at the bottom through a lower chamber of small radiating capacity and at the top by an upper chamber whereby, said passages are submerged; said force feed system intaking water from and discharging water and steam to said lower chamber; and means enclosing a body of water adjacent said discharge and intake of the force feed system and having a number of restricted flow passages, some being at a higher level than others.

4. In combination, a force feed circulating system for cooling variable duty engines by heating water to absorb heat of the engine under certain conditions and by also boiling it to produce large volumes of steam under other conditions, means for cooling the water and condensing the steam, including an air cooled, water-filled radiator of the upright type having passages of great radiating capacity connected at the bottom through a lower chamber of small radiating capacity and at the top by an upper chamber whereby said passages are submerged; said force feed system intaking water from and discharging water and steam to said lower chamber; and means enclosing a body of water adjacent said discharge and intake of the force feed system and having a number of restricted flow passages, some being at a higher level than others, the higher level passages being of greater aggregate flow section.

5. In combination, a force feed circulating system for cooling variable duty engines by heating water to absorb heat of the engine under certain conditions and by also boiling it to produce large volumes of steam under other conditions, means for cooling the water and condensing the steam, including an air cooled, water-filled radiator of the upright type having passages of great radiating capacity connected at the bottom through a lower chamber of small radiating capacity and at the top by an upper chamber whereby said passages are submerged; said force feed system intaking water from and discharging water and steam to said lower chamber; and means enclosing a body of water adjacent said discharge and intake of the force feed system and having a number of restricted flow passages, some being at a higher level than others, the higher level passages being of greater aggregate flow section and relatively remote from the others.

6. In combination a force feed circulating system for cooling variable duty engines by heating water to absorb heat of the engine under certain conditions and by also boiling it to produce large volumes of steam under other conditions, means for cooling the water and condensing the steam, including an air cooled, water-filled radiator of the upright type having passages of great radiating capacity connected at the bottom through a lower chamber of small radiating capacity and at the top by an upper chamber whereby said passages are submerged; said force feed system intaking water from and discharging water and steam to said lower chamber, said discharge means including a conduit extending lengthwise of said chamber and formed with a number of lateral outlets, and partition means in said lower chamber above said discharge means and intake of the pump, extending adjacent the bottoms of said radiating passages and adapted to afford restricted circulation between the upper and lower parts of said chamber.

7. In combination, a force feed circulating system for cooling variable duty engines by heating water to absorb heat of the engine under certain conditions and by also boiling it to produce large volumes of steam under other conditions, means for cooling the water and condensing the steam, including an air cooled, water-filled radiator of the upright type having passages of great radiating capacity connected at the bottom through a lower chamber of small radiating capacity and at the top by an upper chamber whereby said passages are submerged; said force feed system intaking water from and discharging water and steam to said lower chamber, said discharge means including a conduit extending lengthwise of said chamber and formed with a number of lateral outlets; and partition means in said lower chamber above said discharge means and intake of the pump, extending adjacent the bottoms of said radiating passages, said partition means being arranged and formed with high level and low level passages affording restricted thermo-circulation to and from said radiating passages.

Signed at New York city in the county of New York, and State of New York, this 18th day of April, A. D. 1927.

SAMUEL W. RUSHMORE.